June 18, 1963     A. G. BRIGATI ET AL     3,094,111

BALL THROWING MACHINES

Filed Sept. 28, 1961     2 Sheets-Sheet 1

INVENTORS.
Amadio G. Brigati
BY Joseph Fiducia

ATTORNEY.

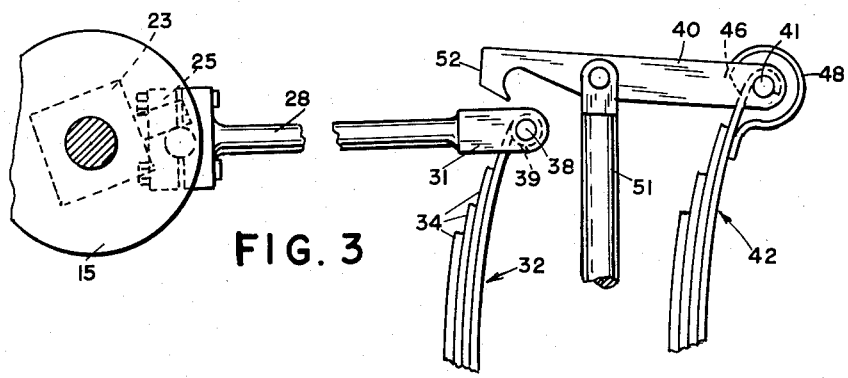
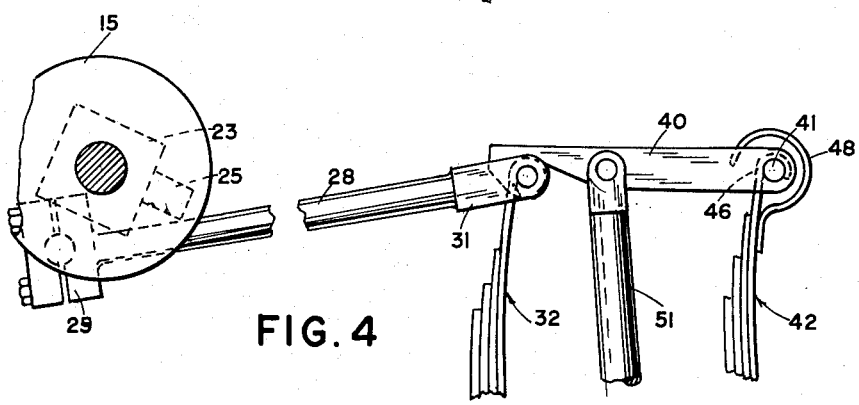
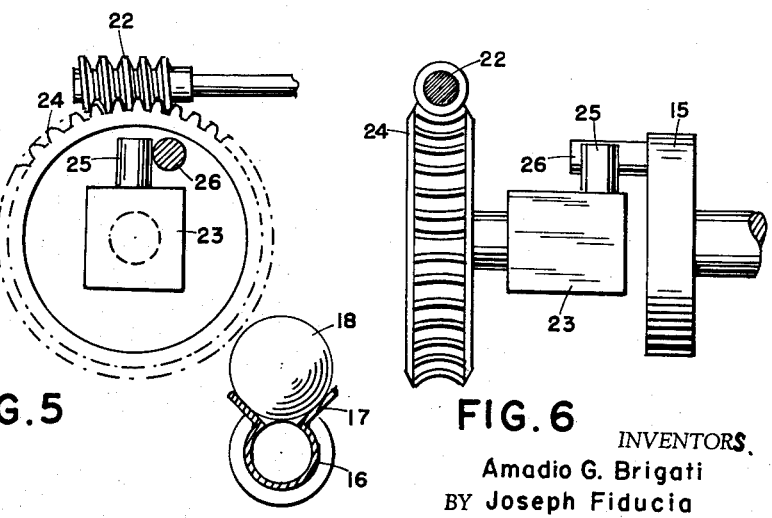
INVENTORS,
Amadio G. Brigati
Joseph Fiducia
BY
ATTORNEY.

United States Patent Office 3,094,111
Patented June 18, 1963

3,094,111
BALL THROWING MACHINES
Amadio G. Brigati, 68 Ave. A, Lodi, N.J., and Joseph
Fiducia, 115 Mountain View Drive, Clifton, N.J.
Filed Sept. 28, 1961, Ser. No. 141,334
7 Claims. (Cl. 124—7)

This invention relates to throwing machines and the like for the mechanical throwing or pitching of, say, a ball in such use as for batting practice and general exercise of a batter to mention one use, although the novel features may be made use of in other throwing machines such as those used in skeet shooting.

Throwing machines have been produced in a number of forms, some operate pneumatically while others supply the energy of throwing by the release of a distorted spring.

Heretofore the usual throwing machine met with in the trade employs a helical spring operated under tension. While for many purposes such springs are satisfactory, they have certain limitations. For example, the storing of a sufficient amount of energy in a helical spring is difficult. If the spring be stiff and short it has very little distance through which it may act, and the intended throwing is more of a batting action giving rise to wild throws unless the ball is held well positioned on the throwing arm. Furthermore helical springs of the sort are particularly liable to breakage. If the spring is long, an undue amount of space is required. Back lash after tripping or release of the spring imposes severe shocks on the ends of helical springs and causes breakage.

Heretofore, variations in ball delivery speed have been slow to carry out. They have usually been made by nut and screw systems, often manipulated by hand, since remote control would usually require a reversible motor.

An object of the invention is to provide a spring system which is rugged and yet has the requisite capacity for storage of throwing energy and action over an appreciable working distance.

Another object is to provide a spring system susceptible of being repaired by replacement of various elements.

Still another object is to provide a ball thrower which can be converted or altered readily from slow delivery to quick delivery.

And yet another object is to provide a ball thrower in which the spring system may be altered by remote control.

These and other apparent objects and advantages are attained in a ball throwing device which, briefly described, includes a crankshaft carrying a radial throwing arm rotatable in a vertical plane, motor means for turning the crankshaft with lost motion means therebetween, a connecting rod on the crank of the shaft, and a half leaved or cantilever spring connected at a movable part thereof connected to the rod and means for connecting a second spring in force-parallel with the leaved spring.

In the accompanying drawing showing, by way of example, one of many possible embodiments of the invention, FIGURE 1 is a side elevation of the throwing machine, with certain parts broken away for clarity.

FIGURES 3 and 4 show operational features of parts of the machine,

FIGURE 5 shows a detail of parts of the machine,

FIGURE 6 shows a detail of the machine, and

FIGURE 7 shows a sectional view of the throwing arm.

Figure 1:
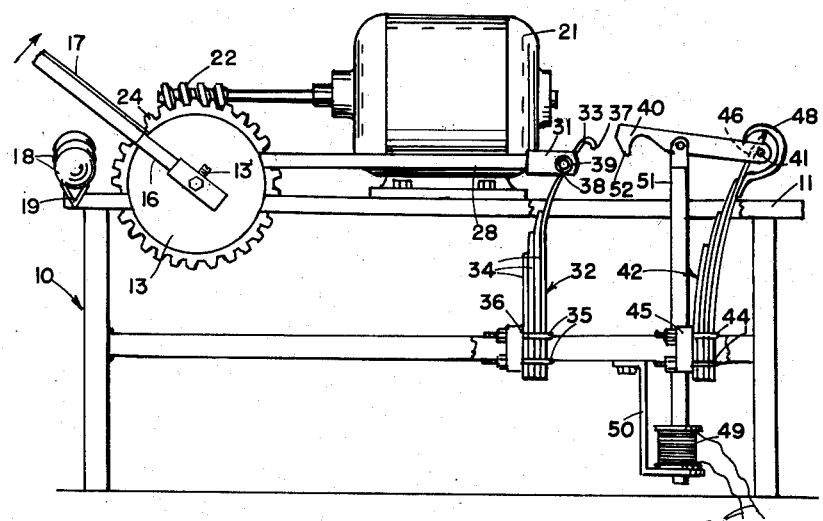
Figure 2:
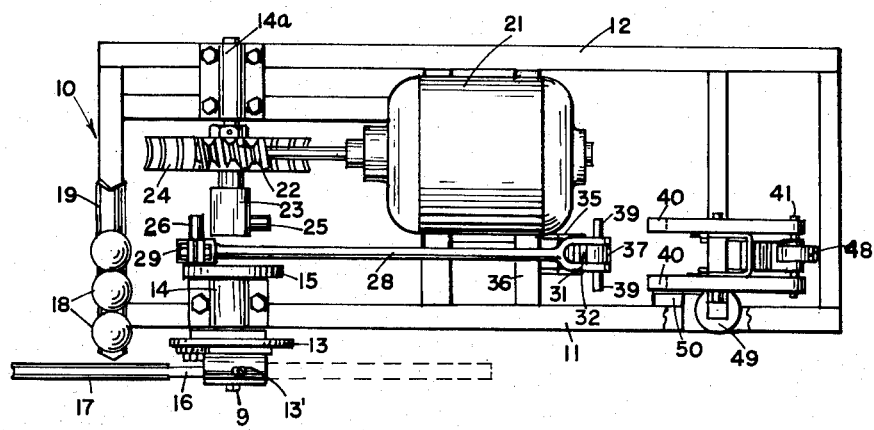
FIGURE 2 is a plan of the machine.

The thrower comprises a table-like frame or stand 10 of, say, welded angle iron having top side rails 11 and 12 on which bearing 14 carries an axially transverse shaft 9 having a crank plate 15, the shaft and plate free to rotate with respect to the frame. The crank plate is provided with a heavy crank pin 26.

Outer of the rail 11, a radial throwing arm 16 is secured to the shaft, as by a disk 13, which arm turns or sweeps somewhat intermittently in a clockwise direction to simulate a human overhand throw. The upper side of arm 16 is provided with a rail 17 to receive the balls 18 coming from a dispenser rail 19.

The crank plate 15 is turned during a part of its revolution by a constantly running motor 21 through a worm 22 engaging a worm gear 24 journaled as at 14a in alinement with the plate and free to turn nearly a complete revolution with respect thereto. To provide positive driving to the plate and arm during a phase, a radial stud 25 fixed on a collar portion 23 fast with respect to the worm gear may engage against the crank pin 26. Thus the turning of the stud may gyrate the crank pin until some action turns the plate and arm faster than turning motion of the stud.

A connecting rod 28 is operatively connected at one end 29 to the crank pin 26 and at the other end 31 to a spring generally designated 32, described in detail below, and tending to move the connecting rod from left to right.

The operation of the invention so far described is generally conventional in that with a constant turning of the worm gear 24 the latter pushes the crank pin 26 and crank plate 15 clockwise until the crank and connecting rod have moved to extreme left position against the reaction of the spring, with the throwing arm to the left of and below the axis of the crankshaft. Suitable angular relative positions of the crank 30 and throwing arm 16 can be determined and fixed by the set screw 13' on the plate 13.

When the crank 30 has been pushed past extreme left, or rather dead center, the spring 32 suddenly retracts the connecting rod, causing the crank and shaft to turn quickly through about a half a turn so that the ball 20 on the arm 16 is thrown to the right.

During the period required for the slow moving stud to catch up with pin 26, a new ball is, by conventional means (not shown) fed to the holder 17 from the dispenser rail 19.

The special points of novelty are in connection with the spring 32 which is composed of somewhat vertical leaves 34 and mounted fast as by U-bolts 35 on a sturdy transverse strut 36 fast on the frame 10. The longest leaf 33 is partially rolled at the free and upper end 37 to provide a bearing bore 38 in a well-known manner.

The end 31 of the connecting rod is bifurcated to receive the spring end 37. A pivot pin 39 in the bore 38 and passing transversely through the end portion 31 connects the rod and spring, the pin 39 being long enough to allow each end thereof to project laterally from the bifurcated end 31. Retraction of the rod by the spring 32 brings the pin 39 within range (FIGURE 3) of a pair of hooks 40 pivoted as at 41 on a similar secondary leaf spring 42 to the rear of the spring 32 so that the secondary spring may be hooked onto the pin 39 at the external end portion, and supplement the force of the spring 32 acting on the connecting rod.

Since it is customary to consider the springs as retracting means, for the purpose of explaining the springs and their accessories forward motion is considered as to the left in the drawing although the ball is thrown to the right.

As shown in FIGURE 1, the secondary spring is mounted fast by U-bolts 44 on a fixed member 45 of the frame 10 so that the free end 46 of the secondary spring projects upwardly and carries the hooks 40 which project forwardly over the pin 39 when the rod is retracted. A torque spring 48 at the pivotal zone 41 normally holds the hooks slightly elevated at the forward ends to prevent their engagement on the pivot pin 39 and so prevent any action by the secondary spring.

When a coupling of the two springs is desired, a solenoid 49 mounted below the hooks, as on a bracket 50, is energized, and through a suitable link 51, draws the hooks, or perhaps better called latches, downwardly where they may hook onto the pin 39. By having the hooks beveled, as at 52 at their forward ends, the hooks may be drawn down before the pin 39 is retracted so that when the pin does become retracted the hooks can latch onto the pin. The solenoid is provided with stops (not shown) to limit downward motion of the hooks and is supplied with control current via leads 54.

In operation, the spring 32 is deformed by forward (leftward in the drawing) motion of its upper end, and energy from the motor is stored in the spring, as explained above, until the crank plate 15 passes dead center. Retraction of the rod by the spring 32 delivers a slow ball. For a fast ball, the solenoid 49 is energized, drawing down the hooks 40 into latching position, so that the pin 39 becomes engaged by the hooks, and a subsequent forward or leftward motion of the rod is against the reaction of the spring 32 and the secondary spring 42. After dead center is passed, both springs retract the rod so that a fast ball is delivered.

After any delivery there is usually sufficient vibration of the springs relative to each other so that even though the hook be forwardly recessed, the torque spring 43 is able to lift the latch prior to forward movement of the rod when the solenoid is de-energized.

While only two springs are shown selectively connectable in the manner described the invention is applicable to a plurality of springs. However each forward spring (here 32) must normally assume a rear position within range of the hooks carried by the springs immediately behind it as 42 in the present instance.

It is apparent that slight changes may be made in the form, construction and arrangement of the several parts, as shown, without departing from the spirit of the invention and we do not, therefore, wish to limit ourselves to the exact construction shown and described herein.

What we claim as our invention and desire to secure by Letters Patent of the United States, is:

1. In a throwing device, two fixedly mounted springs having respectively separated substantially free ends for reaction movement in a substantially common direction; a crank carrying a throwing arm for rotation; a reciprocatory connecting rod having one end connected to the crank and extending in said direction and having the other end connected to one of said free ends; a hooking latch pivotally mounted on one of said free ends for selective pivotal movement to latching position for selectively hooking onto the free end of the other spring and movement to non-latching position; bias means for holding the latch in one of said positions, and a reciprocatory member linked onto the latch for moving the latch against the bias means to the other position.

2. In a throwing device as claimed in claim 1, said bias means being for holding the latch in non-latching position.

3. In a throwing device as claimed in claim 1, the connecting rod being attached to the free end of one spring and the latch being pivotally mounted on the free end of the other spring.

4. In a throwing machine, a frame; a rotatable shaft on the frame and a throwing arm on the shaft, the shaft being provided with a crank; a primary leaf spring having a free end portion movable toward and away from the axis of the shaft and a fixed end secured fast to the frame; a reciprocatory connecting rod having one end carried on the crank; the spring being provided with a pivot bearing opening in the free end portion thereof; a pivot pin passing through the opening and carrying the other end of the connecting rod, the pin projecting laterally from the spring and connecting rod, the connecting rod having a forward position when the leaf spring is stressed and a retracted position when the leaf spring is substantially unstressed; a secondary spring having a portion fast on the frame and having a free end substantially restricted to movement in the general direction of said pin and having a normal position when the secondary spring is unstressed; a hook pivotally mounted on the free end of the secondary spring and sufficiently long to hook onto said pin when the connecting rod is in retracted position and the secondary spring in normal position; means for tending to hold the hook out of the zone of the pin, and reciprocatory means mounted on the hook for bringing the hook into the zone of movement of the pin for hooking onto the pin when the connecting rod is in the retracted position to connect the secondary spring with the leaf spring for retracting the connecting rod with greater force when the connecting rod has been substantially moved to forward position.

5. In a throwing machine as claimed in claim 4, the secondary spring being a leaf spring.

6. In a throwing machine, a frame; a rotatable shaft on the frame and a throwing arm fast on the shaft; a crank provided on the shaft; a primary leaf spring having a free end portion movable toward and away from the shaft axis and a fixed end secured fast to the frame; a reciprocatory connecting rod having one end carried on the crank; the spring being provided with a pivot bearing opening in the free end portion thereof; a pivot pin passing through the opening and carrying the other end of the connecting rod, the pin projecting laterally from the spring and connecting rod, the connecting rod having a forward position when the leaf spring is stressed and a retracted position when the leaf spring is substantially unstressed; a secondary spring having a portion fast on the frame and having a free end substantially restricted to movement in the general direction of said pin and having a normal position when the secondary spring is unstressed; a hook pivotally mounted on the free end of the secondary spring and sufficiently long to hook onto said pin when the connecting rod is in retracted position and the secondary spring in normal position; means for tending to hold the hook out of the zone of the pin, a link member on the hook, and a solenoid connected to the link for drawing the hook to engagement with the pin to connect the secondary spring with the leaf spring to supplement the action of the latter.

7. In a throwing machine, a frame; a rotatable shaft on the frame and a crank and a throwing arm fast on the shaft; a pair of multi-leaved springs each having a free end portion movable in approximate alinement toward and away from the shaft axis and a fixed end secured fast to the frame; a reciprocatory connecting rod having one end carried on the crank and having the other end connected to one of said free ends; a hooking latch pivotally mounted on one of said free ends for selective pivotal movement to latching position for selectively hooking onto the free end of the other spring and movement to non-latching position; bias means for holding the latch in one of said positions, and a reciprocatory member linked onto the latch for moving the latch against the bias means to the other position, and a solenoid to move said member.

References Cited in the file of this patent

UNITED STATES PATENTS

| | | |
|---|---|---|
| 1,295,069 | Rouen | Feb. 18, 1919 |
| 1,821,755 | Jeter | Sept. 1, 1931 |
| 1,897,317 | McEachern | Feb. 14, 1933 |
| 2,245,258 | Darrell | June 10, 1941 |